United States Patent Office 3,444,828
Patented May 20, 1969

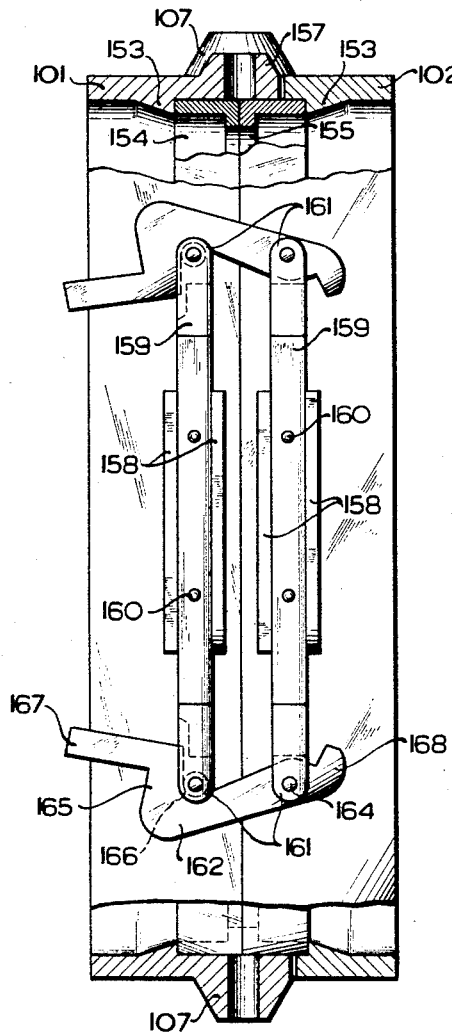
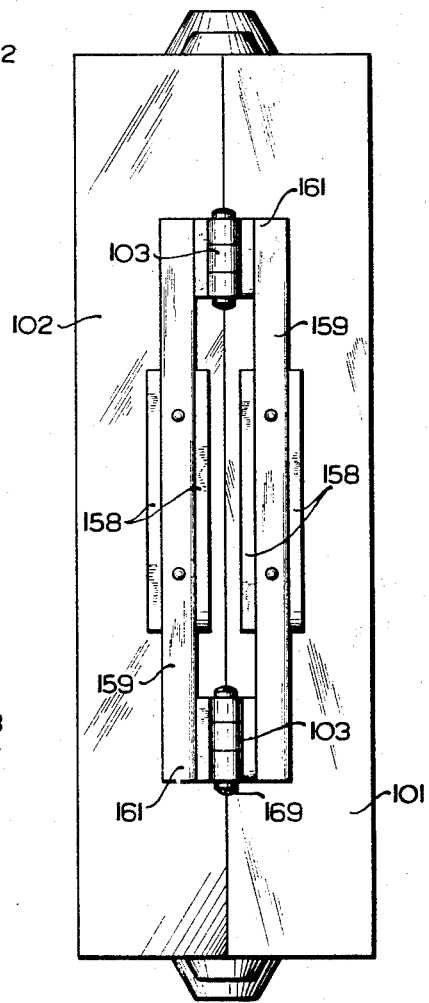

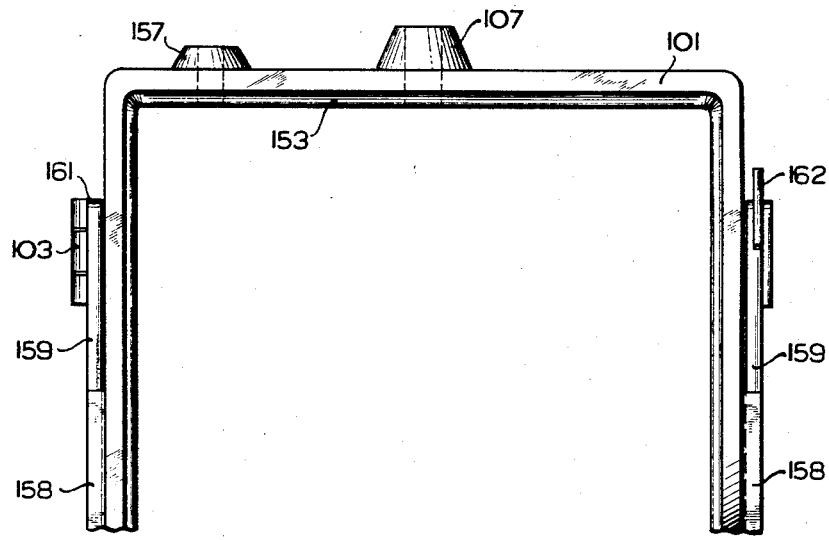
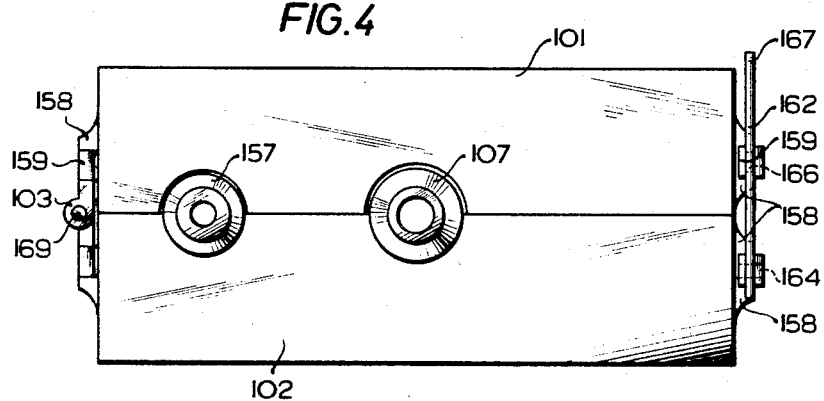

3,444,828
MOULD FRAME
Roland Hörnlein, Schwabisch Gmund, and Gerold Domhan, Waldstetten, Kreis Schwabisch Gmund, Germany, assignors to Walter Hornlein Metallwarenfabrik KG., Schwabisch Gmund, Germany
Filed Oct. 19, 1965, Ser. No. 497,728
Claims priority, application Germany, May 29, 1965, H 56,181, H 56,182
Int. Cl. A23g 1/22
U.S. Cl. 107—19    9 Claims

ABSTRACT OF THE DISCLOSURE

A mould frame, especially of the type including two frame halves hinged together, for use in the production of figures from chocolate or the like, wherein elastic bars are provided on each mould frame, each bar being secured, at least at the central portion thereof, to a frame half and having at least one free end which may be elastically connected to a corresponding bar on the opposite frame half by suitable connecting means, whereby the two frame halves are resiliently pressed together in the closed condition.

---

This invention relates to a mould frame, especially a hinged frame, provided with two frame halves, for the production of chocolate bodies.

Such frames are widely known. In all such frames, the difficulty consists in avoiding escape of chocolate mass between the two frame halves or mould halves. This is important since an escape of chocolate mass not only signifies a loss, but also can considerably soil the production plant.

The problem upon which the invention is based consists of forming a mould frame of the initially stated kind, in which the escape of chocolate masses between the two frame halves or mould halves is made more difficult or at least substantially reduced. Here the simplest possible constructional means should be used. In solution of this problem according to the invention, the two frame halves are sprung towards one another, namely more expediently sprung equally on all sides—in the case of hinged frames both on the hinged side and on the opposite fastening side. In this manner the two frame halves lie very tightly on one another due to the mutual pressing, so that chocolate mass escapes between them in far fewer cases, and then to a far lesser extent than in the known mould frames consisting of two halves.

According to the present invention, at least on one frame half there are secured bars of elastic material provided with free ends, and in each case the free end of a bar secured on the one frame half is connected or connectable with the other frame half. With such a constructional realization of the invention, the technical means for the mutual springing of the two frame halves are especially simple and are suitable above all also for springing on all sides, that is to say, in the case of hinged frames, both on the hinged side and on the fastening side.

In an especially preferred form of embodiment of the invention, bars are secured on each frame half and in each case the free end of a bar secured on the one frame half is connected or connectable with the free end of a bar secured on the other frame half. In this manner the desired springing is achieved with extremely simple means, namely exploiting the elasticity of the material of the bar along its free, unsecured end sections.

More advantageously, the bars are secured approximately in the middle and are free at both ends and there connected or connectable with one another, so that two cooperating bars from a bar pair and lie opposite to one another in equal position. It would however also be possible under some circumstances to secure the bars at one end, so that they comprise only one free end. In this case the cooperating bars would not have to lie side by side, but could be secured to their frame half in each case at mutually remote ends.

It would be possible to provide the bars on all four sides of a frame or equally only on one side. However the bars are preferably secured to two opposite sides of the mould frame, whereby uniform springing is achieved on all sides. The bars can consist of various elastic materials. In one preferred form of embodiment of the invention bars of steel have proved their value. It is in fact sufficient if the springing is very slight. The essential point is the achievement of the very great spring force which can be generated easily with the means according to the invention. For this purpose the bars more expediently possess a rectangular cross-section, the two cooperating bars in each case arranged such that the narrow side of one bar faces the corresponding narrow side of the cooperating bar.

In accordance with a further feature of the present invention, the bars are inserted between supporting ribs provided on the frame, preferably moulded thereon, along which they find good support. The actual securing means can then be made relatively weak. By the length of the supporting ribs the spring travel and spring force of the free bar ends can be selected very exactly.

In a preferred embodiment of the invention, for the formation as hinged frame, the bars are connected or connectable with one another on the one frame side through hinges and on the opposite frame side through disengagable catches. In this case, a catch hook is more advantageously articulated on the free end of the bar of the one frame half, and on the free end of the bar of the other frame half pertaining thereto there is provided a detent preferably having a roller for the catch hook, in which this hook snaps with springing of the two bars.

Further details and advantages of the invention will appear from the following description of various examples of embodiment which are represented diagrammatically by way of example in the accompanying drawings, wherein:

FIGURE 1 shows an embodiment according to the invention, formed as hinged frame, in a view of the fastening side, partially in section, FIGURE 2 shows a view of the opposite hinge side of the embodiment according to FIGURE 1, FIGURE 3 shows a plan view of the embodiment according to FIGURE 1, FIGURE 4 shows an end view of the embodiment according to FIGURE 1.

In the drawings, the hinged frame as illustrated in FIGURES 1 to 4 consists of a frame half 101 and a frame half 102, which form the so-called master frame and are provided internally with protruding strips 153, on each of which a frame insert 154 is arranged in which there are recesses 155 for the reception of the individual moulds. The hinged frame as illustrated is what is called a spinning frame, which is utilised for the production of hollow chocolate bodies. For this purpose on the frame half 101 there are moulded a pivot bearing dog 107 and a seating 157 for the reception of a halting dog. The frame is rotated in the production plant about the pivot bearing dog 107, while the mentioned halting dog (not shown) can engage in the seating 157 to arrest the frame.

According to the invention on both longitudinal sides of the frame halves 101, 102 there are formed longitudinal ribs 158, between which the bars 159 are inserted and secured for example by means of rivets 160 on the frame half in each case. The bars 159 consist of steel and are elastic. They possess a rectangular cross-section, the narrow sides of the rectangular cross-section facing one another. The bars 159 bear along the ribs 158, so that they have a firm seating there. As shown by the drawings, the bars 159 extend a distance out beyond the end of the longitudinal ribs 158 and are there connectable or connected with one another at their free ends 161 on the one frame side by means of catch hooks 162 (FIGURE 1) and on the opposite frame side by means of hinges 103, (FIGURE 2).

The catch hooks 162 are pivotably articulated at the free end 161 of the bar 159 of the frame half 102 at the one end in each case through a bolt 164, and at the other end possess a hook nose 165, which can snap in behind a roller 166 arranged at the free end of the bar of the other frame half 101. In closing, the springing of the bars 159 is utilised, so that the catch hook 162 is securely and firmly seated. At the end of the hook nose 165 there is a protruding extension 167 which protrudes beyond the frame and upon which there can act an opening mechanism (not shown) of the plant in which the frame is used. At the other end, beside the bolt 164, the catch hook has a stop nose 168 which in the opened condition of the catch hook comes to abut on the relevant bar 159 and limits the opening position of the catch hook. Such a catch hook 162 is situated in each case at the two free ends 161 of the bars 159 illustrated in FIGURE 1. Where the bars 159 are there made in fork shape, as shown in FIGURE 3, the catch hook being arranged between the fork prongs.

According to FIGURE 2 the hinges are made very simple. The individual hinge parts through which the hinge bolt 169 is pushed are moulded on the bars 159.

The frame halves are so dimensioned that in the closed condition they lie upon one another under spring pressure. Due to the length of the supporting ribs 158 the spring force of the bars 159 can be selected very exactly within the available elasticity range. Above all it is also very advantageous that the parts according to the invention occupy very little space and protrude little.

Naturally within the scope of the invention some modifications of the example of embodiment as illustrated in the drawing are possible. Thus the bars 159 could be resiliently free only at one end, while at the other end they are secured. It would also be possible to provide such a bar 159 in each case only on the one frame half and to connect its resilient free end with the fixed part of the other frame half. However the example of embodiment as illustrated in FIGURES 1 to 4 is an especially advantageous embodiment.

Although the invention has been illustrated and described with reference to a preferred embodiment thereof, it is to be clearly understood that the invention is in no way limited to the details of this embodiment but is capable of numerous modifications within the scope of the appended claims.

We claim:

1. A mould frame for the production of chocolate bodies, comprising two frame halves each including a respective one of two halves of a mould, each of said frame halves having at least one longitudinally-extending outer side, at least two bars of elastic material, a respective one of each secured alongside and substantially parallel to a respective one of said longitudinally-extending outer sides so that substantially the entire length of said bar lies in close proximity to said respective longitudinally-extending outer side, said bars being oriented substantially parallel to the dividing plane of the frame and having at least one free end, and connecting means operable to interconnect said free end of each bar, secured to one of said two frame halves, with the other of said two frame halves, with springing of said bars, said bars thus constituting spring means for resiliently pressing together said two frame halves in the closed condition of said mould frame.

2. A mould frame as claimed in claim 1, each of said bars being secured approximately at its middle and being free at its two ends and being connectable to said other of said frame halves at both of said two ends.

3. A mould frame as claimed in claim 2, each of said bars having an approximately rectangular cross-section with two opposite narrow sides and two opposite broad sides, said bars being disposed so that in each case two cooperating bars face one another with their narrow sides in the closed condition of the mould frame.

4. A mould frame as claimed in claim 1, further comprising for each of said bars a pair of support ribs arranged in spaced relation to one another on said frame halves, each of said bars being located between two of said support ribs and having an elastic section between said support ribs and the point at the end of said bars which are connectable with the opposite half of the frame.

5. A mould frame according to claim 1, wherein each of said two frame halves includes at least two opposite outer sides and a respective one of each of said bars is secured alongside a respective one of each of said two opposite outer sides of each frame half.

6. A mould frame for the production of chocolate bodies, comprising two frame halves each including a respective one of two halves of a mould, each of said two frame halves having at least one longitudinally-extending outer side, said respective outer sides being oriented in a substantially parallel relationship, at least two bars of elastic material, a respective one of each secured alongside and substantially parallel to a respective one of said longitudinally-extending outer sides so that substantially the entire length of said bar lies in close proximity to said respective longitudinally-extending outer side, one of said bars being thus secured to one of said frame halves and the other of said bars being thus secured to the other of said two frame halves respectively, said bars being oriented substantially parallel to the dividing plane of the frame and having at least one free end, and connecting means operable to interconnect the free end of one of said bars with the free end of the other of said bars, with springing of said bars, said bars thus constituting spring means for resiliently pressing together said two frame halves in the closed condition of said mould frame.

7. A mould frame as claimed in claim 6, each of said bars being secured approximately at its middle and being free at the two ends and being connectable at both of its two ends with a respective other one of said bars secured on said other of said frame halves.

8. A mould frame for the production of chocolate bodies, comprising two frame halves, hinge means on a first side of said frame hinging said frame halves to one another, catches on a second side of said frame oppositely to said first side for releasably locking said frame halves to one another, said catches consisting in each case of a catch hook articulated on one of said frame halves and of a detent for said catch hook arranged on the other of said frame halves, a plurality of bars of elastic material each having two free ends, said bars being secured respectively one on each of said frame halves on each of said first side and said second side of said frame, on said first frame side said two free ends of the respective one of said bars secured on the one of said frame halves being connected with said two free ends of the respective one of said bars secured on the other of said frame halves through said hinge means, on said second frame side one of said catch hooks being pivoted to each of said free ends of the respective one of said bars secured to the one of said frame halves, and one of said detents being arranged on each of said free ends of the respective one of said bars secured to the other of said frame halves, said catch hooks being engageable in said detents with springing of said bars on said second frame side.

9. A mould frame for the production of chocolate bodies, comprising two frame halves having longitudinally-extending parallel outer sides, hinge means on a first one of said longitudinally-extending parallel outer sides of one frame half hinging said frame halves to one another, catch means on a second one of said longitudinally-extending parallel outer sides of the other frame half, opposite to said first one, for releasably locking said frame halves to one another, at least two bars of elastic material, one of said two bars secured alongside and substantially parallel to said first one of said sides of said one frame half so that substantially the entire length of said bar lies in close proximity to said first one of said sides, the other of said two bars secured alongside and substantially parallel to said second one of said sides of said other frame half so that substantially the entire length of said bar lies in close proximity to said second one of said sides of said other frame half, said bars being oriented substantially parallel to the dividing plane of the frame and having at least one free end, the free end of the bar on said first frame side, on one of said frame halves, being connected with the other of said frame halves through said hinge means, and the free end of the bar secured to said second frame side, on one of said frame halves being connectable with the other of said frame halves through said catch means, with springing of said bars, said bars thus constituting spring means resiliently pressing together said two frame halves in the closed condition of said mould frame.

References Cited

UNITED STATES PATENTS

| | | | |
|---|---|---|---|
| 736,155 | 8/1903 | Rifkin et al. | 99—383 X |
| 1,219,180 | 3/1917 | Somers | 249—170 |
| 1,382,294 | 6/1921 | Kukac | 249—163 |
| 1,864,242 | 6/1932 | Guyot | 249—170 |
| 2,463,439 | 3/1949 | Strietelmeier | 99—380 X |
| 2,734,227 | 2/1956 | Costick et al. | 18—39 |
| 2,796,033 | 6/1957 | Feinstein | 107—54 |
| 2,932,854 | 4/1960 | Stetina | 18—26 X |
| 3,000,056 | 9/1961 | Parsch | 18—26 X |
| 3,048,896 | 8/1962 | Marlo | 18—26 X |
| 3,166,332 | 1/1965 | Olson. | |
| 3,202,086 | 8/1965 | Brubaker | 99—351 |

FOREIGN PATENTS 690,233   4/1953   Great Britain.

WALTER A. SCHEEL, *Primary Examiner.*

J. M. NEARY, *Assistant Examiner.*

U.S. Cl. X.R.

18—43; 249—137, 163; 292—80